Patented Sept. 18, 1951

2,568,457

UNITED STATES PATENT OFFICE 2,568,457

MANUFACTURE OF FOAM RUBBER SPONGE ARTICLES

Robert J. Meyer, South Bend, Ind., assignor to United States Rubber Company, New York, N. Y., a corporation of New Jersey No Drawing. Application September 29, 1949, Serial No. 118,705

2 Claims. (Cl. 260—723)

This invention relates to the addition of gelling agent to latex foam in the manufacture of foam rubber sponge articles.

It is known to prepare latex foam by whipping or beating air into an alkaline latex. A gelling agent, such as an aqueous suspension of alkali-metal (sodium or potassium) silicofluoride, is mixed or dispersed into the foam before shaping, as by pouring the foam into molds of the desired shape, or spreading the foam as in the manufacture of sheet sponge. Heating of the thus sensitized foam or allowing it to stand for a given time after shaping, gels the foam on reduction of its pH due in part at least to hydrolysis of the silico-fluoride, so that collapse of foam will not subsequently occur in the vulcanizing and drying operations in the manufacture of the final sponge product. It is difficult to adequately mix or disperse the alkali-metal silico-fluoride suspension into the latex foam, which is relatively viscous. Too much mixing tends to break down the foam, whereas insufficient mixing will produce collapse of ungelled portions of the foam on drying and vulcanizing. Also pumping difficulties may add insufficient or even no silicofluoride to the foam.

According to the present invention, the aqueous suspension of the alkali-metal silicofluoride gelling agent is modified so that it has a distinct color and can be observed as it is mixed into the foam but without altering the color of the final sponge product.

In carrying out the present invention, there is incorporated in the aqueous suspension of the alkali-metal silicofluoride which is to be added to the latex, a small amount of alkali-metal hydroxide to give a pH of the suspension above 6.8 to prevent local coagulation on its addition to the alkaline latex, and a small amount of paranitrophenol. Paranitrophenol changes color from colorless to yellow over a pH range from 5.0 to 7.0. There is no theoretical upper limit of the pH of the aqueous suspension of alkali-metal silicofluoride, but since larger amounts will be used where the pH is increased with consequent dilution of the latex foam and increase in the shrinkage of the sponge on drying, it has been found advantageous to keep the pH between 6.8 and 7.5, but it may be raised to 10 or 11 and still utilize the improvement of the invention. The aqueous dispersion of the alkali-metal silicofluoride containing the paranitrophenol is a yellow color and the alkaline foam becomes yellow on mixing the alkali-metal silicofluoride suspension with it. This yellow color of the silicofluoride suspension blending with the white or light or different colored foam gives visual evidence of the presence of the silicofluoride suspension and the progress of its mixing with the foam. The disappearance of streaks of white foam shows increasing degree of dispersion of the gelling agent in the foam. Thus mixing conditions can be readily adjusted to give a uniform yellow color, indicative of good mixing or dispersing of the gelling agent. This is very important with respect to the presence of collapsed areas in the final sponge product. The latex compound which is whipped into a foam has a pH above 10, and may be as much as 11.5 or higher. The alkalinity of the latex compound may be the result of the pH of the original latex, such as from the use of ammonia or alkali-metal hydroxide used in the preservation of the latex, as in natural rubber latex, or from the use of alkali-metal hydroxides and/or soaps as emulsifying agents in the preparation of synthetic rubber latices, or may be in part or in whole the result of the addition of alkali materials when compounding the natural or synthetic rubber latices before foaming, as when incorporating conventional accelerators, antioxidants, stabilizing agents, frothing agents, etc. The sodium silicofluoride which is mixed into the foam hydrolyzes with the release of hydrofluoric acid which reduces the pH of the foam and gels the same. As is known, the latex in the foam is still alkaline when gelling takes place, so that the gelled foam remains yellow in color. The gelled foam is heated to vulcanize the same, and the heat and moisture during vulcanization will have hydrolized the sodium silicofluoride to such an extent that the pH is reduced to 7 or below where a substantial amount of the yellow color disappears. This gives visual evidence where there has been a non-uniform temperature during cure with consequent non-uniform vulcanization, since the insufficiently heated sections will retain their yellow color. The vucanized sponge articles are conventionally washed in water and this removes substantially all of the remaining yellow color. The sponge articles are then dried, and the drying will remove any yellow color that may be left after washing. The addition of paranitrophenol shows no effects on the gel characteristics or on visual structure of the foam.

The following illustrates the invention, all parts and percentages referred to herein being by weight:

A concentrated (creamed) natural rubber latex was compounded according to the following formulation:

|  | Dry | Wet |
| --- | --- | --- |
| Latex (68% solids concentration) | 100 | 147 |
| Accelerator (50% aqueous paste) | 2.3 | 4.6 |
| Sulfur (60% aqueous paste) | 2.5 | 4.3 |
| Zinc Oxide (60% aqueous paste) | 5.0 | 8.3 |
| Potassium Oleate (20% aqueous paste) | 2.0 | 10 |
| Antioxidant (50% aqueous paste) | 1.0 | 2 |

The original latex had a pH of 9.7. After compounding, the pH was 10.8. The compounded latex was frothed by whipping in a Hobart beater to a density of 110 g./100 cc.

A suspension of sodium silicofluoride was prepared by grinding in a ball mill the materials in the following formulation: 25 parts of sodium silicofluoride, 0.75 part of sodium hydroxide, 1 part of colloidal clay as dispersing agent, 0.5 part of paranitrophenol and 75 parts of water. This gelling agent suspension was bright yellow. It was mixed into the latex froth prepared as above in the ratio of 25 grams of the above dispersion to one pound of latex froth. The latex froth gradually became an even yellow on continuing the mixing. The froth was poured into molds, heated for 4 minutes at 27° C. to gel the foam and heated for 30 minutes at 105° C. to vulcanize the rubber therein. A substantial amount of the yellow color disappeared on heating for vulcanization. The vulcanized sponge was washed in water which removed almost all of the residual yellow color, only a slight tint remaining. The sponge was then dried, all yellow coloration having disappeared at the end of the drying.

The amount of paranitrophenol is not critical, usually amounts from .2 to 5 parts of paranitrophenol per 100 parts of sodium silicofluoride being used. The paranitrophenol may be added in the form of the phenol or the sodium or potassium (alkali-metal) salt of paranitrophenol which can be used interchangeably with the parent compound for the purpose of the present invention. The paranitrophenol in any case will form the sodium or potassium salt in the aqueous solution of alkali-metal hydroxide such as is used in preparing the aqueous suspension of sodium silicofluoride as above. The amount of alkali-metal silicofluoride used as a gelling agent is usually from 0.5 to 3.5 parts per 100 parts of rubber solids of the latex. The latex foam may be prepared from the latex by mechanical means, such as whipping or beating as in the above illustration, or the latex foam may be prepared from the latex by chemical reaction of an acid on a carbonate in the latex, or by the catalytic decomposition of hydrogen peroxide in the latex as with catalase decomposition catalyst. The latex may be a natural rubber latex, or a synthetic rubber latex, or a mixture of any of them. The synthetic rubber latex may be an aqueous emulsion polymerizate of one or a mixture of butadienes-1, 3, e. g. butadiene-1, 3, 2-methyl-butadiene-1, 3, 2-chloro-butadiene-1, 3, 2, 3-dimethyl-butadiene-1, 3, piperylene, or an aqueous emulsion polymerizate of a mixture of one or more such butadienes-1, 3 with one or more other polymerizable compounds which are capable of forming rubbery copolymers with butadienes-1, 3, e. g. up to 70% by weight of such mixture of one or more mono-ethylenically unsaturated compounds which contain a $CH_2=C<$ group where at least one of the disconnected valences is attached to an electro-negative group, that is, a group which substantially increases the electrical dissymmetry or polar character of the molecule, such copolymerizable monoethylenically unsaturated compounds being exemplified by aryl olefines, such as styrene and vinyl naphthylene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of making foam rubber sponge articles which comprises adding to an alkaline latex foam having a pH in the range from above 10 to 11.5 an aqueous suspension of a small amount of alkali-metal silicofluoride having a pH in the range from above 6.8 to 11 and containing from 0.2% to 5% by weight of paranitrophenol based on the alkali-metal silicofluoride, and mixing said aqueous suspension of alkali-metal silicofluoride into said latex foam until the yellow color imparted to the alkali-metal silicofluoride suspension by the paranitrophenol is uniformly blended throughout the latex foam, geling the latex foam, vulcanizing the gelled foam and hydrolyzing the alkali-metal silicofluoride to reduce the alkalinity of the foam whereupon a substantial amount of the yellow color disappears, and washing the rubber sponge to remove substantially all of the remaining yellow color.

2. The method of making foam rubber sponge articles which comprises adding to an alkaline latex foam having a pH in the range from above 10 to 11.5 an aqueous suspension of a small amount of alkali-metal silicofluoride having a pH in the range from above 6.8 to 7.5 and containing from 0.2% to 5% by weight of paranitrophenol based on the alakil-metal silicofluoride, and mixing said aqueous suspension of alkali-metal silicofluoride into said latex foam until the yellow color imparted to the alkali-metal silicofluoride suspension by the paranitrophenol is uniformly blended throughout the latex foam, gelling the latex foam and hydrolyzing the alkali-metal silicofluoride to reduce the alkalinity of the foam, vulcanizing the gelled foam whereupon a substantial amount of the yellow color disappears, and washing the rubber sponge to remove substantially all of the remaining yellow color.

ROBERT J. MEYER.

REFERENCES CITED

The following references are of record in the file of this patent:

UNITED STATES PATENTS

| Number | Name | Date |
| --- | --- | --- |
| 2,180,725 | Ward et al. | Nov. 21, 1939 |
| 2,313,464 | Clayton | Mar. 9, 1943 |
| 2,343,541 | Ewart | Mar. 7, 1944 |
| 2,350,294 | Stewart | May 30, 1944 |

OTHER REFERENCES

"Acid-Base Indicators," by N. Kolthoff, New York, 1937, page 311.